United States Patent
Kim

(10) Patent No.: US 10,320,313 B2
(45) Date of Patent: Jun. 11, 2019

(54) ARC FREE PHASE CONTROL ALTERNATIVES FOR AC MOTOR STARTERS

(71) Applicant: Young Jun Kim, Seoul (KR)

(72) Inventor: Young Jun Kim, Seoul (KR)

( * ) Notice: Subject to any disclaimer, the term of this patent is extended or adjusted under 35 U.S.C. 154(b) by 528 days.

(21) Appl. No.: 14/643,093

(22) Filed: Mar. 10, 2015

(65) Prior Publication Data

US 2016/0268933 A1 Sep. 15, 2016

(51) Int. Cl.
| H02P 25/14 | (2006.01) |
| H02P 1/24 | (2006.01) |
| H02P 6/16 | (2016.01) |
| H02P 1/04 | (2006.01) |
| H02P 27/02 | (2016.01) |

(52) U.S. Cl.
CPC ............... *H02P 1/04* (2013.01); *H02P 27/02* (2013.01)

(58) Field of Classification Search
CPC ................................. H02P 25/04; H02P 6/002
See application file for complete search history.

(56) References Cited

U.S. PATENT DOCUMENTS

| 5,159,657 | A | * | 10/1992 | Runggaldier | ....... | H02M 1/0845 318/812 |
| 5,481,171 | A | * | 1/1996 | Woginrich, Jr. | .......... | H02P 1/26 318/778 |
| 6,108,206 | A | * | 8/2000 | Criniti | ................... | H01L 23/467 174/16.3 |
| 6,984,897 | B2 | * | 1/2006 | Skeist | ....................... | H02P 9/02 290/1 R |
| 2003/0107343 | A1 | * | 6/2003 | Kim | ......................... | H02P 1/42 318/782 |
| 2006/0274459 | A1 | * | 12/2006 | Zhou | ..................... | H01H 50/546 361/23 |
| 2007/0046247 | A1 | * | 3/2007 | Barie | ....................... | H02P 27/16 318/799 |
| 2008/0165457 | A1 | * | 7/2008 | Premerlani | ........ | H01H 59/0009 361/31 |
| 2011/0012545 | A1 | * | 1/2011 | Aarestrup | ................ | H02K 3/28 318/400.11 |
| 2011/0313717 | A1 | * | 12/2011 | Lu | ............................. | G01P 3/48 702/147 |
| 2014/0346896 | A1 | * | 11/2014 | Lumsden | ................... | H02J 1/14 307/126 |

(Continued)

OTHER PUBLICATIONS

University of Surrey, Magnetics: quantities, units, and relationships, Magneti flux section, Jan. 27, 2014, http://web.archive.org/web/20140127101902/http://info.ee.surrey.ac.uk/Workshop/advice/coils/terms.html#flux.*

(Continued)

*Primary Examiner* — Bickey Dhakal
*Assistant Examiner* — Charles S Laughlin
(74) *Attorney, Agent, or Firm* — Kaplan Breyer Schwarz, LLP

(57) ABSTRACT

An arc-free phase control circuit for an AC motor that brings about an energy saving effect according to a load change and operates efficiently in terms of cost reduction while securing electrical stability by virtue of an overload protection function. The circuit includes a first relay, a TRIAC, a second relay, a voltage sensing unit, a current sensing unit, a speed voltage sensing unit, a zero-cross point detection unit, and a controller.

2 Claims, 20 Drawing Sheets

(56) References Cited

U.S. PATENT DOCUMENTS

| | | | | |
|---|---|---|---|---|
| 2015/0014277 A1* | 1/2015 | Theisen | ............... | H01H 33/02 |
| | | | | 218/1 |
| 2015/0180377 A1* | 6/2015 | Hua | ............... | H02P 1/04 |
| | | | | 318/778 |
| 2015/0333685 A1* | 11/2015 | Wei | ............... | H02P 1/16 |
| | | | | 318/430 |
| 2015/0349673 A1* | 12/2015 | Wu | ............... | H02P 6/182 |
| | | | | 318/779 |

OTHER PUBLICATIONS

Surrey, UK, workshop page, Jan. 27, 2014, http://web.archive.org/web/20140127101902/http://info.ee.surrey.ac.uk/Workshop/advice/coils/terms.html#flux.*

* cited by examiner

ARC FREE PHASE CONTROL ALTERNATIVES FOR AC MOTOR STARTERS

FIELD OF THE INVENTION

The present invention relates to a control circuit of an AC motor, and more particularly, to an arc-free phase control circuit for an AC motor which brings about an energy saving effect according to a load change and operates efficiently in terms of cost reduction while securing electrical stability by virtue of an overload protection function.

BACKGROUND OF THE INVENTION

In general, a starter switching circuit of an AC motor uses electromagnetic force of a coil, and an electromagnetic relay or an electromagnetic contactor is typically used as the starter switching circuit according to a contact capacity. However, a non-contact solid state relay has been recently used to prevent contact wear using a semiconductor element. A short circuit protecting circuit breaker is connected in series to an overload protector in the starter switching circuit so as to constitute a motor starter. Here, in some cases, an inverter circuit may be replaced with a speed control function in order to improve energy efficiency.

Since a start current of a motor is generally about seven or eight times a rated current, the contact capacity of the switching circuit should be designed to be high according to the start current. Furthermore, it should be considered that starting characteristics are degraded due to an increase in the occurrence of overheating of a motor coil when start/stop is frequently performed. On the contrary, in the case of the solid state relay using a semiconductor contact, the start current can be controlled, but power consumption occurs due to heating of a semiconductor element itself while a motor is driven. Furthermore, when the solid state relay fails and short-circuits, the circuit is highly possibly damaged by a fault current.

Moreover, an overcurrent protector for a motor or a short-circuit current protecting circuit breaker is separated from a switch, causing an additional increase in the cost. However, it is very difficult to simplify a circuit in order to reduce the cost, and, due to the characteristics of a thermal-type protective element, operation characteristics thereof are not stable according to use environments.

In addition, a driving voltage phase control circuit employing a semiconductor element may be simply designed. However, it is difficult to secure energy efficiency achieved through, for example, variable frequency drive, when a variable speed-variable load such as a fan, a pump or a compressor is driven at a rated or lower speed. In particular, it is difficult to control such a load at a low speed.

SUMMARY OF THE INVENTION

Accordingly, the present invention is directed to providing an arc-free phase control circuit for an AC motor, which regulates a start current by gradually applying a driving voltage according to a predetermined start time or a speed of a motor through driving voltage phase control using a semiconductor contact, and, if the start is completed, drives a relay contact connected in parallel to the semiconductor contact to thereby avoid an electric arc that may occurs when a contact is switched over. Furthermore, according to the arc-free phase control circuit for an AC motor, a switch control circuit, an overcurrent sensing function and an overload protection function may be integrated in a digital circuit, so that the cost may be reduced, and, moreover, a phase control cycle of a control circuit may be extended so that speed control may be performed accurately even at a low speed, and energy efficiency may be improved even when a load varies.

A device according to the present invention includes a first relay for connecting one terminal of an AC power supply source to a motor, a TRIAC for connecting another terminal of the AC power supply source to the motor in a TRIAC mode at the time of start or stop, a second relay connected in parallel to the TRIAC to connect the other terminal of the AC power supply source to the motor in a normal state, a voltage sensing unit configured to sense a power supply voltage and output the power supply voltage to a first input terminal, a current sensing unit configured to sense an applied current and output the applied current to a second input terminal, a speed voltage sensing unit configured to sense a speed voltage induced in the motor and output the speed voltage to a third input terminal, a zero-cross point detection unit configured to detect a zero-cross point of the line voltage and output the zero-cross point to a fourth input terminal, and a controller configured to receive the power supply voltage, the applied current, the zero-cross point and an induced voltage from the first to fourth input terminals, phase-control the TRIAC at every half cycle of a commercial frequency to perform soft start, turn off the TRIAC after switching to the second relay at the zero-cross point when a normal driving state is reached, and phase-control the TRIAC in the TRIAC mode to perform an energy saving and speed control procedure.

The controller gradually decreases a phase delay time at the time of start to perform soft start and then allows switching at a zero-cross point so that a start current flows through the TRIAC at the time of start, and a run current flows through a contact of the second relay in a normal operation state or if a current decreases to a peak energization current of the second relay. Furthermore, the controller determines whether a current mode is a TRIAC mode, and receives, if the current mode is the TRIAC mode, a motor coil induced voltage through the third input terminal for a TRIAC-off time and receives the applied current through the second input terminal to calculate a speed of the motor and compare the speed with a set speed. Then, the controller changes a level of an applied voltage using a phase difference control scheme so that the applied voltage is constantly maintained.

The controller calculates the speed of the motor in the TRIAC mode to change, if the speed is low, a control cycle for phase-controlling the applied voltage through the TRIAC to one third (about 20 Hz) or one fifth (about 12 Hz) of a commercial frequency (about 60 Hz) according to the speed, wherein the phase difference between the voltage and the current is decreased to increase the applied voltage and the applied current in order to increase a motor torque.

DETAILED DESCRIPTION

The present invention and a technical object achieved by carrying out the present invention will be more apparent by the preferred embodiments of the present invention described below. The embodiments described below are provided merely to describe the present invention and are not intended to limit the scope of the present invention.

Figure 1:
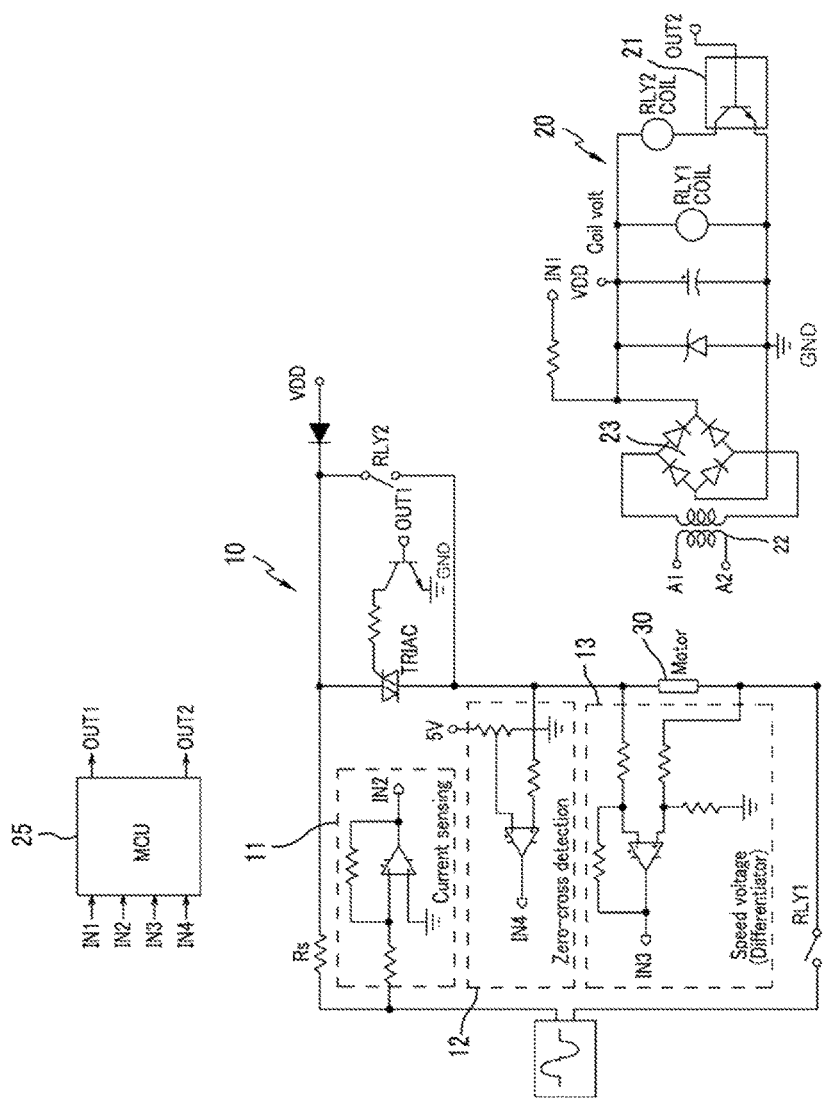
FIG. 1 is a circuit diagram illustrating an arc-free phase control circuit for an AC motor according to the present invention.
Figure 2:
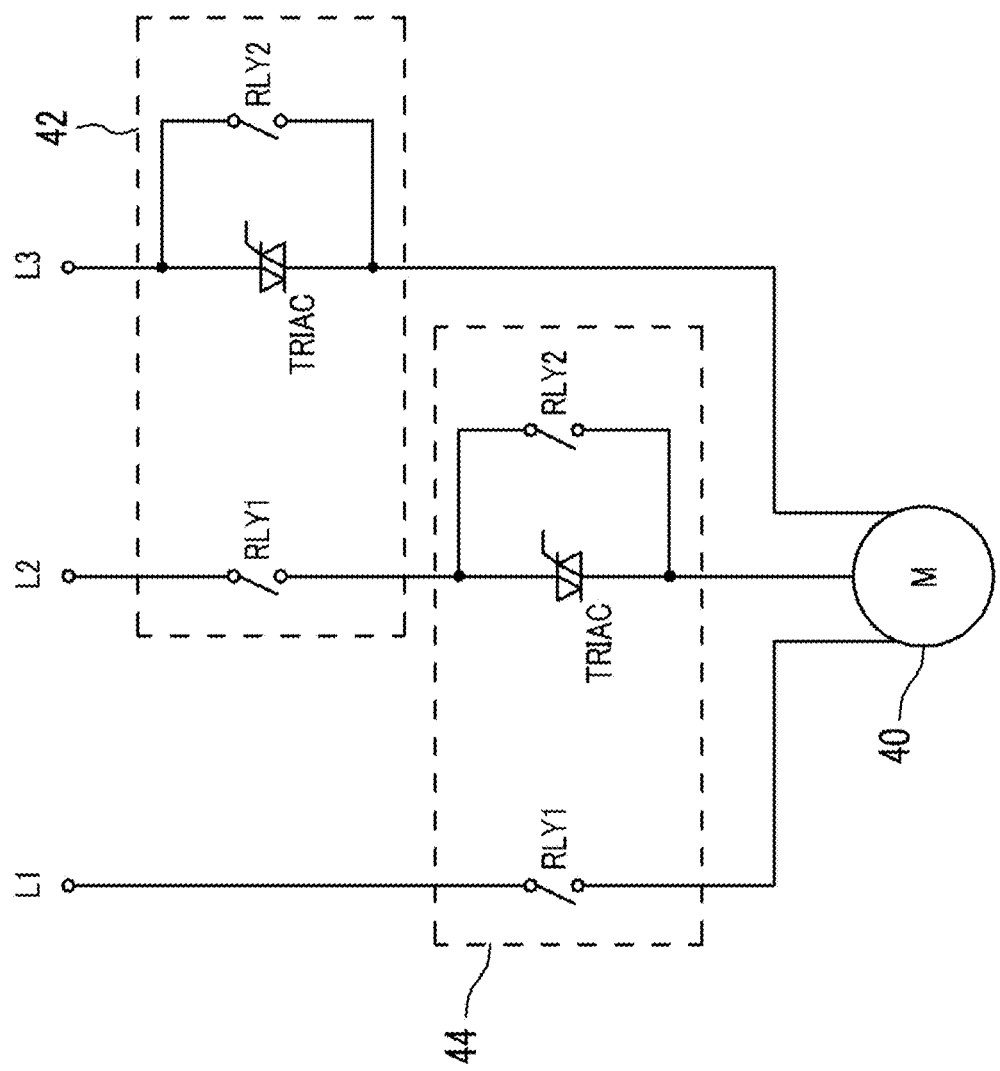
FIG. 2 is a schematic diagram illustrating the case where the present invention is implemented for a three-phase AC motor.

FIG. 1 is a schematic circuit diagram illustrating an arc-free phase control circuit for an AC motor according to the present invention, and FIG. 2 is a schematic diagram illustrating the case where the present invention is implemented for a three-phase AC motor.

The arc-free phase control circuit for an AC motor according to the present invention may be applied to a single-phase AC motor 30 using a relay combination of a TRIAC that is a semiconductor relay and a mechanical relay RLY2 connected in parallel thereto as illustrated in FIG. 1, or may be applied to a three-phase AC motor 40 using a first relay combination 42 and a second relay combination 44 as illustrated in FIG. 2. That is, although a single-phase AC motor is used as a load in the embodiments of the present invention, the present invention may also be applied to a three-phase AC motor and most AC devices having different starting and driving characteristics.

As illustrated in FIG. 1, the arc-free phase control circuit for an AC motor according to the present invention includes: a first relay RLY1 for connecting one terminal of an AC power supply source to the motor 30; the TRIAC for connecting another terminal of the AC power supply source to the motor 30 in a TRIAC mode at the time of start or stop; a second relay RLY2 connected in parallel to the TRIAC to connect the other terminal of the AC power supply source to the motor 30 in a normal state; a voltage sensing unit for receiving AC power applied to terminals A1 and A2 through a transformer to sense a full-wave rectified driving circuit power supply voltage VDD and output start and stop signals to a first input terminal IN1; a current sensing unit 11 for sensing an applied current to output the applied current to a second input terminal IN2; a speed voltage sensing unit 13 for sensing a speed voltage induced in the motor 30 to output the voltage to a third input terminal IN3; a zero-cross point detection unit 12 for detecting a zero-cross point of a line voltage to output the detected zero-cross point to a fourth input terminal IN4; and a controller 25 for receiving the starting and stop signals, the applied current, the zero-cross point and the induced voltage from the first to fourth input terminals IN1 to IN4 to phase-control the TRIAC at every half cycle of a commercial frequency to perform start, for turning off the TRIAC after switching to the second relay RLY2 at the zero-cross point when a normal driving state is reached, and for phase-controlling the TRIAC in the TRIAC mode to perform energy saving and speed control.

Referring to FIG. 1, a circuit of the present invention includes a driving circuit 10 for transferring AC power to the motor 30, a relay power supply circuit 20 for supplying required power to a relay, and the controller (MCU) 25 for controlling the motor 30 according to a predetermined phase control procedure.

The driving circuit 10 includes the current sensing unit 11 for sensing a load current with a voltage on a sensing resistor Rs, the zero-cross point detection unit 12 for detecting the zero-cross point of the line voltage, the speed voltage sensing unit 13 for detecting an induced (speed) voltage induced in the motor 30 in proportion to a speed of the motor 30, the TRIAC gate current flow from the controller power supply voltage VDD to the power supply ground according to the first output signal OUT1 for turning on/off the TRIAC, and the second relay RLY2 turned on/off according to a second output signal OUT2 of the controller 25.

The relay power supply circuit 20 includes a transformer 22 for isolating and decreasing AC power input through the terminal A1/A2, a diode bridge 23 for full-wave rectifying the decreased AC power, a smoothing filter, the first input terminal IN1 for monitoring the relay power supply voltage VDD so that the start or stop is sensed, a first relay coil RLY1 COIL, a second relay coil RLY2 COIL, and a transistor 21 for driving the second relay coil RLY2 according to the second output signal OUT2 of the controller 25.

The controller 25 processes parameters input through the first to fourth input terminals IN1 to IN4 according to an algorithm of installed software so as to perform various control processes illustrated in FIGS. 3 to 8 using the first and second output signals OUT1 and OUT2. That is, when an AC device is started or stopped, the controller 25 according to the present invention maintains an open state of a TRIAC contact connected in parallel to a contact of the second relay RLY2 while a contact of the first relay RLY1 is switched over, and maintains a closed state, i.e., turn-on state, of the TRIAC contact while the second relay is switched over, so as to regulate currents applied to the relay contacts while the contact of the first or second relay is switched over.

Furthermore, in order to protect a peripheral circuit from an initial lock or short circuit accident that occurs when the AC device 30 is started, the controller 25 memorizes a zero-crossing time point of an input voltage and then outputs an ON signal to the first output terminal OUT1 after a lapse of a certain phase delay time (about 135°<Tg<about 180°)

to drive a TRIAC gate so as to apply a current to the TRIAC in a voltage-dropped state, senses the TRIAC current that is in a half-wave state through the second input terminal IN2 to calculate a circuit impedance Rw and an allowable peak current Ip, and immediately turns off, if a fault current is anticipated at a normal voltage, the TRIAC so as to protect a load and the switching circuit from the lock or short circuit accident within a half cycle of used power when the AC device is started.

Moreover, the controller 25 according to the present invention determines whether a current mode is a TRIAC mode while the AC motor is driven, and receives, if the current mode is the TRIAC mode, a motor coil induced voltage through the third input terminal IN3 for a TRIAC-off time and receives an applied current through the second input terminal IN2 to calculate a motor speed proportional to the coil induced voltage and inversely proportional to the applied current, and compares the motor speed with a calculated value of induced voltage/rated current at a preset rated speed to control an intensity of the applied current at every cycle using a phase difference control scheme so that the rated speed is maintained even when a load varies.

Main functions of the controller 25 performed according to a control algorithm of the controller 25 are described below for each item.

A. Arc-Free Switching Contact

Figure 3:
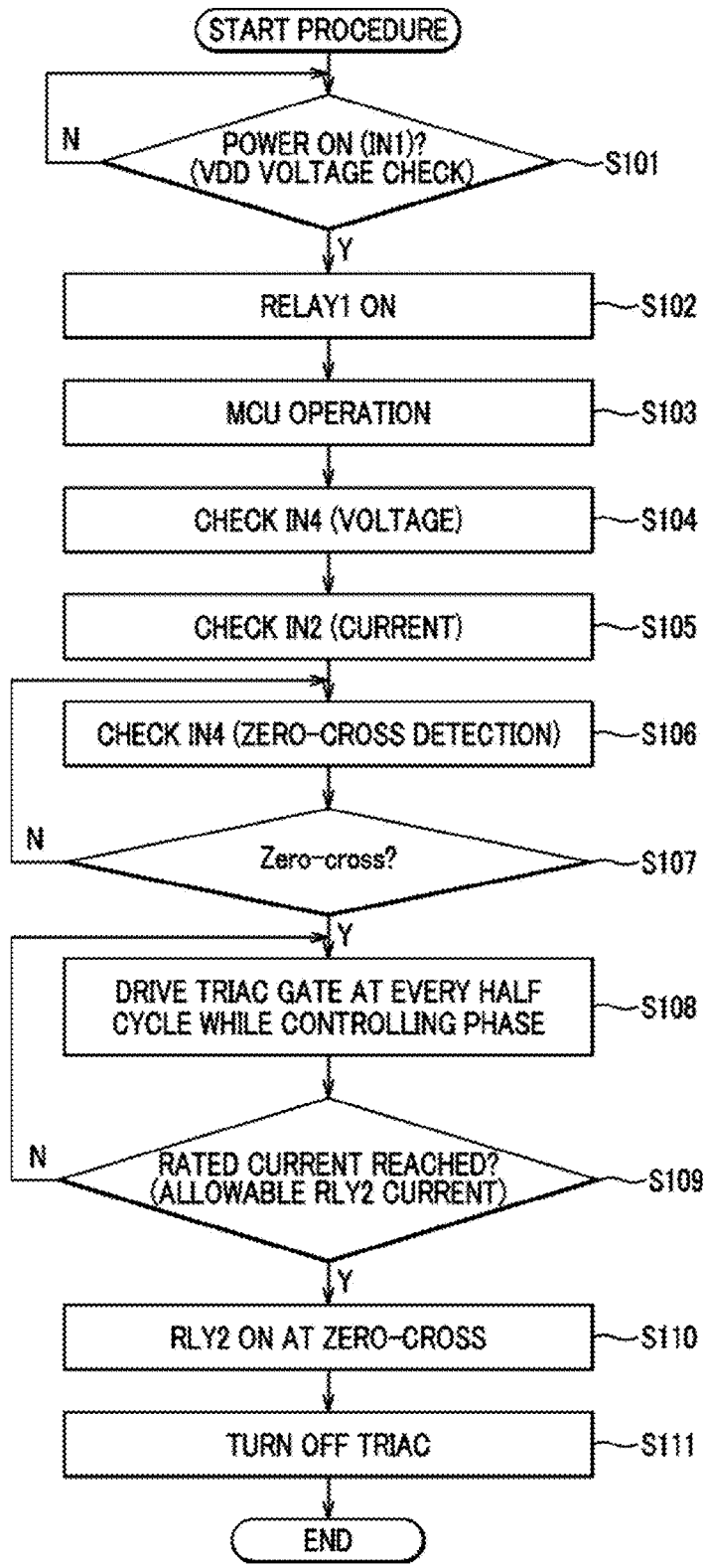
FIG. 3 is a flowchart illustrating a procedure of starting a motor through phase control according to the present invention.
Figure 4:
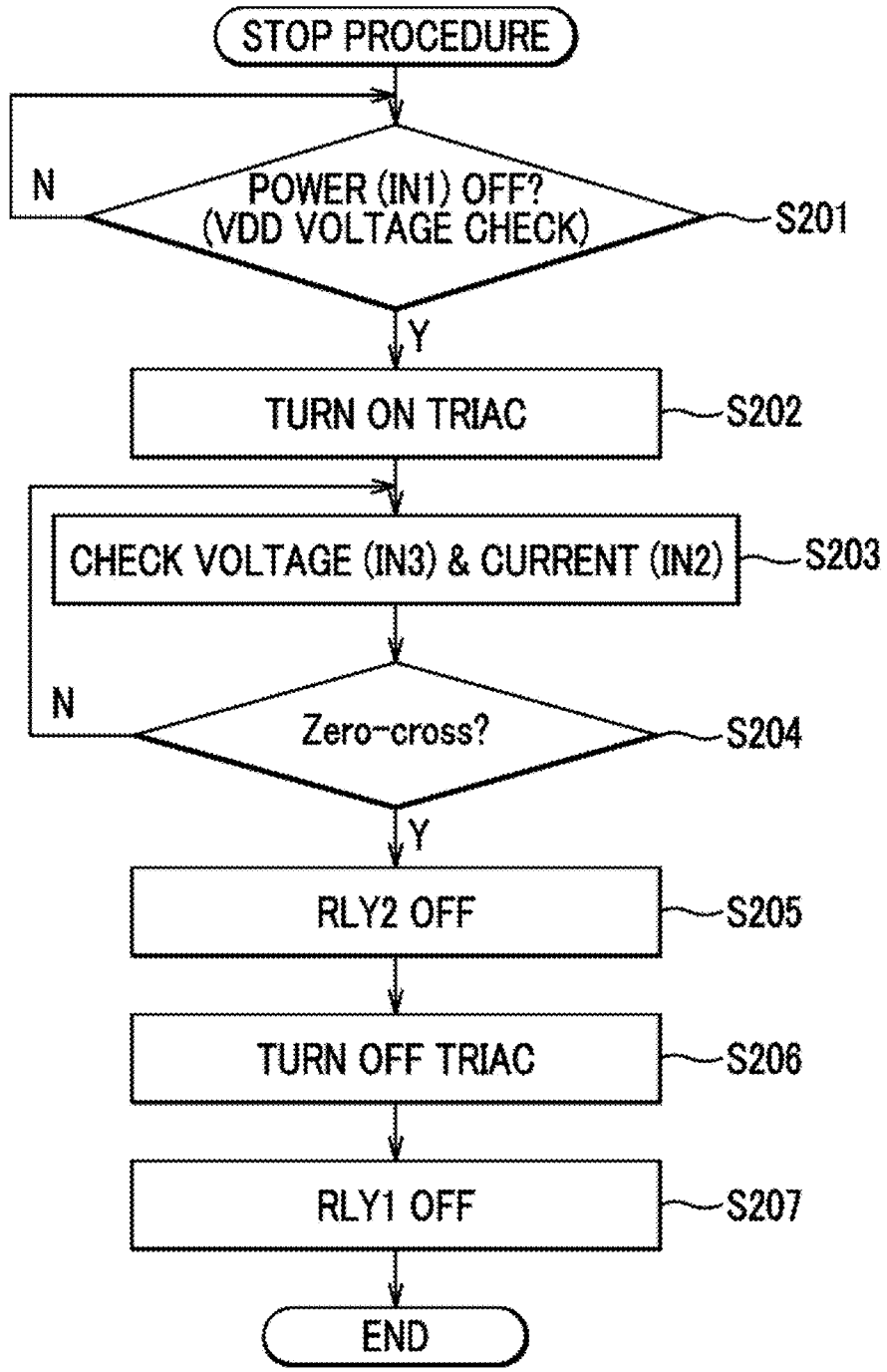
FIG. 4 is a flowchart illustrating a procedure of stopping a motor according to the present invention.

FIG. 3 is a flowchart illustrating a procedure of starting a motor through phase control according to the present invention, and FIG. 4 is a flowchart illustrating a procedure of stopping a motor according to the present invention.

Figure 9:
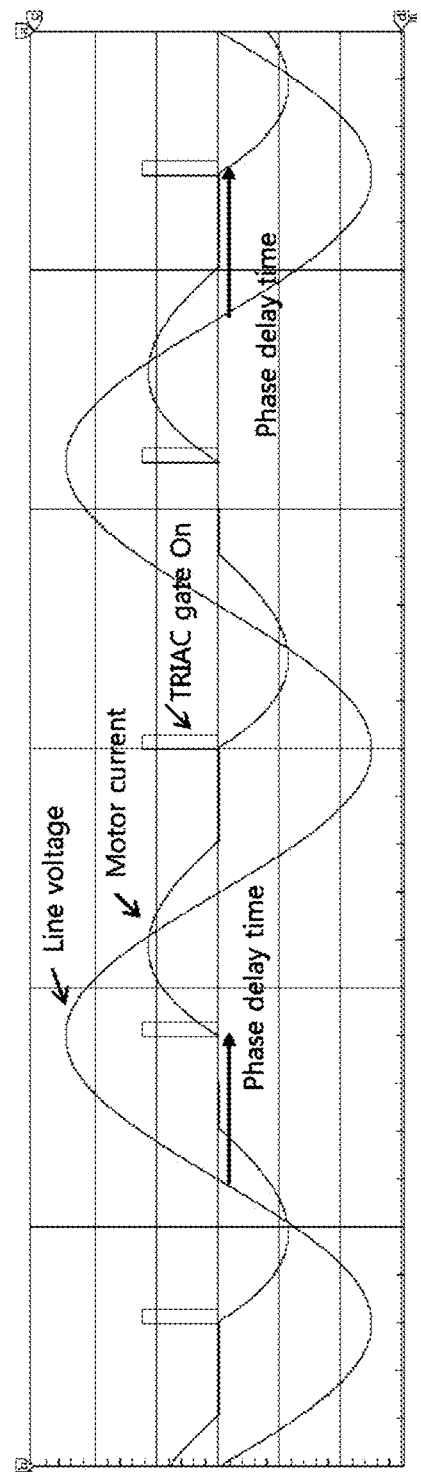
FIG. 9 is a graph illustrating voltage/current waveforms for describing a phase control concept according to the present invention.
Figure 10:
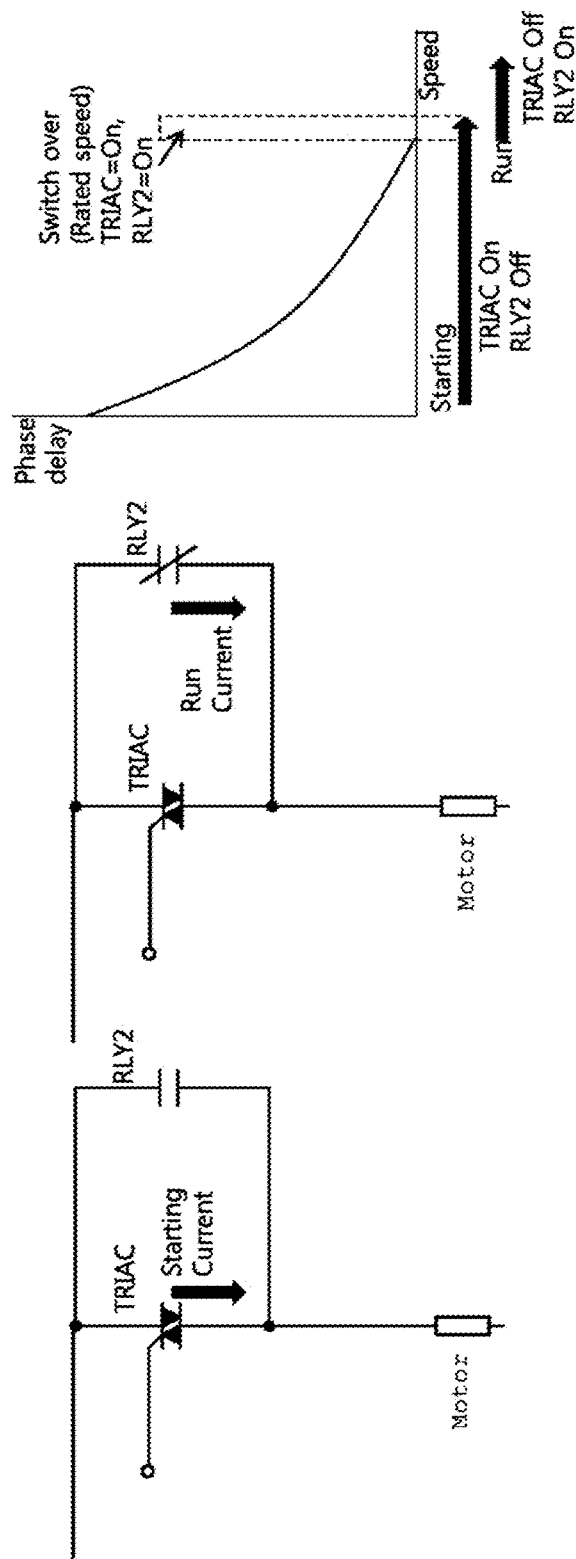
FIG. 10 is a diagram illustrating a phase delay and a current flow when phase control is performed according to the present invention.
Figure 11:
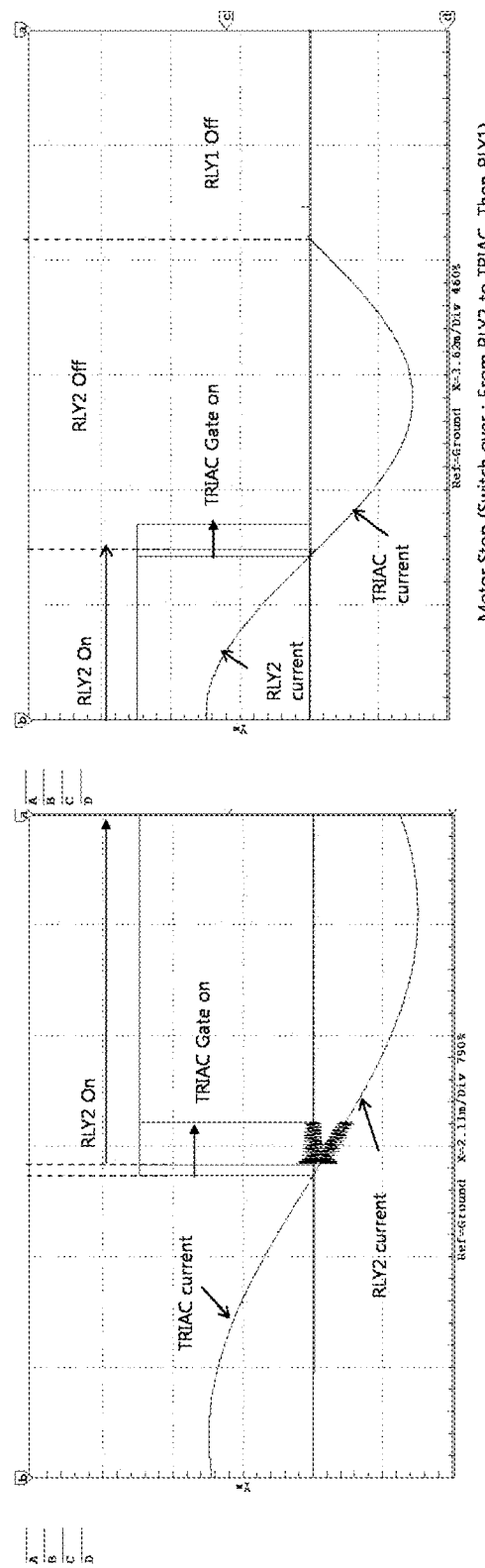
FIG. 11 is a diagram illustrating a zero-cross point switching operation according to the present invention.

FIG. 9 is a graph illustrating voltage/current waveforms for describing a phase control concept according to the present invention, FIG. 10 is a diagram illustrating a phase delay and a current flow when phase control is performed according to the present invention, and FIG. 11 is a diagram illustrating a zero-cross point switching operation according to the present invention.

Referring to FIG. 3, when power is applied to the terminals A1 and A2 by an automatic or manual on/off switch, the relay voltage VDD is generated by the relay power supply circuit 20 so that power supply voltages VDD and GND are applied to the MCU 25 to operate the MCU 25, and this voltage (about 5-24V DC) is applied to the first relay coil RLY1 COIL so that the first relay contact RLY1 is turned on (S101-S103).

The MCU 25 receives a signal of the fourth input terminal IN4 to calculate and memorize a magnitude (line voltage) of the signal using an internal analog-to-digital converter (ADC), and receives a voltage between both terminals of the current sensing resistor Rs (shunt resistor) through the second input terminal IN2 via the current sensing unit 11 to determine whether a circuit current is equal to or lower than a leakage current, and, if it is determined that the circuit current is equal to or lower than the leakage current, the MCU 25 determines that the TRIAC that is a switching contact and the second relay RLY2 are normally open states (S104, S105).

Thereafter, the MCU 25 checks a zero-cross point of an applied voltage through an input signal of the fourth input terminal IN4, and applies the On (pull down) signal to the first output terminal OUT1 (gate current from VDD or the TRIAC gate port to GND) at every half cycle to start the motor 30 (S106-S108). Here, as illustrated in FIG. 9, in the case of a motor of which a start torque is equal to or larger than a load torque, a level of a motor voltage that is inversely proportional to a phase difference between a driving voltage and a motor current is gradually increased to control a rotational acceleration while the motor is started.

Referring to FIG. 9, a gate of the TRIAC is driven by the signal of the first output terminal OUT1 obtained by delaying the line voltage from a voltage level of 0 by as much as a phase delay time. Accordingly, the TRIAC is turned on at every half cycle so that the motor current flows at every half cycle.

When a rated current (a second relay allowable current) is reached after the start is completed, the ON signal is output to the second output terminal OUT2 for controlling the contact of the second relay RLY2 connected in parallel to the TRIAC to limit heat of the TRIAC, and then the TRIAC is turned off (S109-S111). Here, as illustrated in FIG. 11, the first output terminal OUT1 for controlling the gate of the TRIAC outputs turn-on state while the contact of the second relay RLY2 is switched over. Therefore, an electrical arc that is generated when the contact of the second relay RLY2 is switched over can be limited so that the first and second relays RLY1 and RLY2 may be easily designed to have a reduced contact capacity.

Referring to FIG. 10, it may be understood that a start current flows through the TRIAC at the time of start, a run current flows through the contact of the second relay RLY2 at the time of normal operation, and a phase delay time is gradually decreased at the time of start so that switching is performed at a zero-cross point after soft start.

The voltage VDD is checked at the first input terminal IN1, and, if power is cut off, as illustrated in FIG. 4, the TRIAC is turned on, and a voltage of the third input terminal IN3 and a current of the second input terminal IN2 are checked to turn off the second relay RLY2 at a zero-cross point, and then the TRIAC is turned off before the first relay RLY1 is turned off (S201-S207). As described above, according to the present invention, when the contact of the first relay RLY1 is switched over, the second relay RLY2 and the TRIAC are turned off, and, when the contact of the second relay RLY2 is switched over, the TRIAC is constantly turned on, so that an arc that may be generated when the contact of the first or second relay RLY1 or RLY2 is switched over may be avoided.

Furthermore, according to the present invention, reduction of a current capacity is checked after waiting for completion of starting a motor, and then, in consideration of an operation time of the coil of the second relay RLY2, the signal of the second output terminal OUT2 is controlled so that the contact of the second relay RLY2 is switched over at a zero-cross point of a current of the TRIAC as illustrated in FIG. 11.

B. Inrush Current Protection

Figure 5:
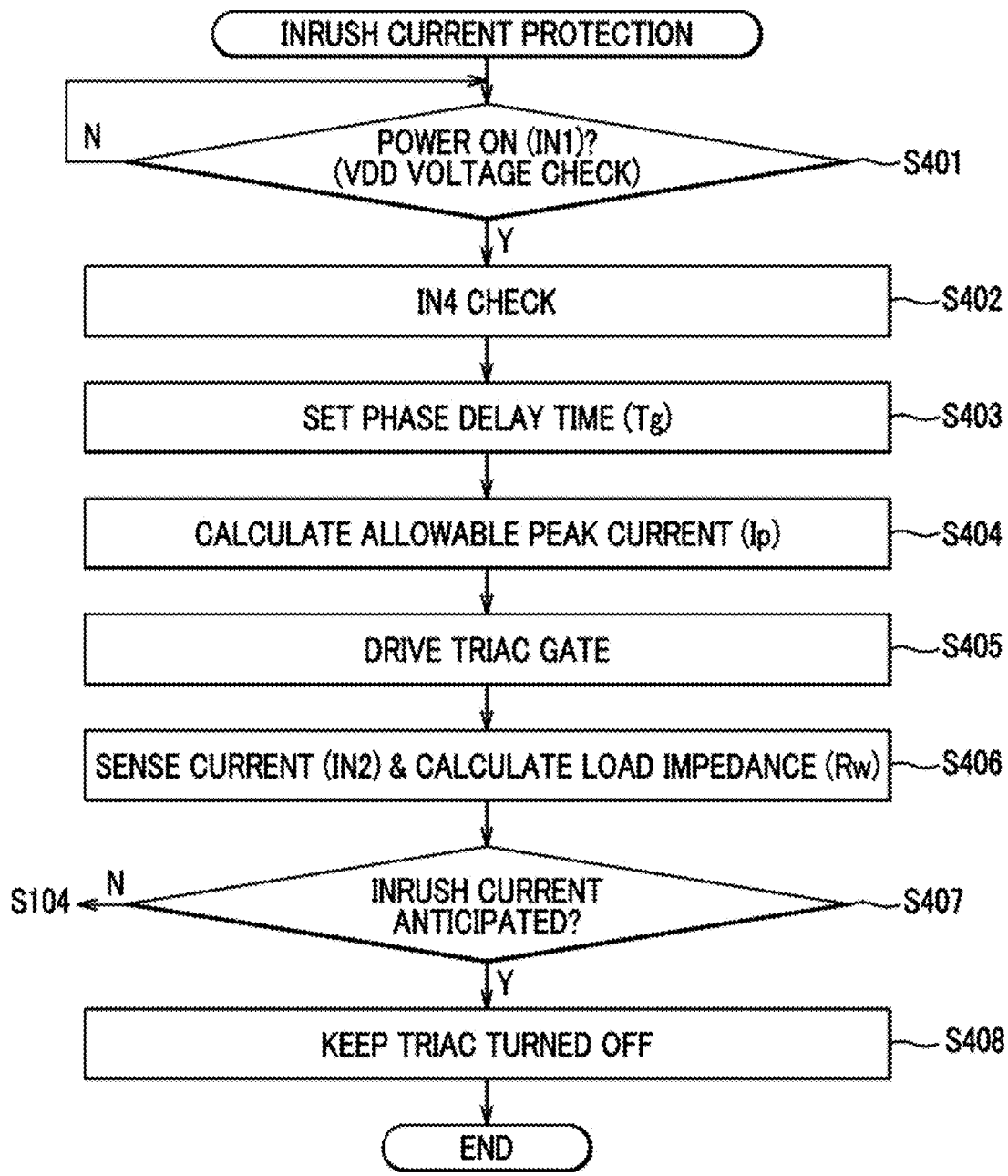
FIG. 5 is a flowchart illustrating a procedure of protecting a motor from an overcurrent according to the present invention.
Figure 12:
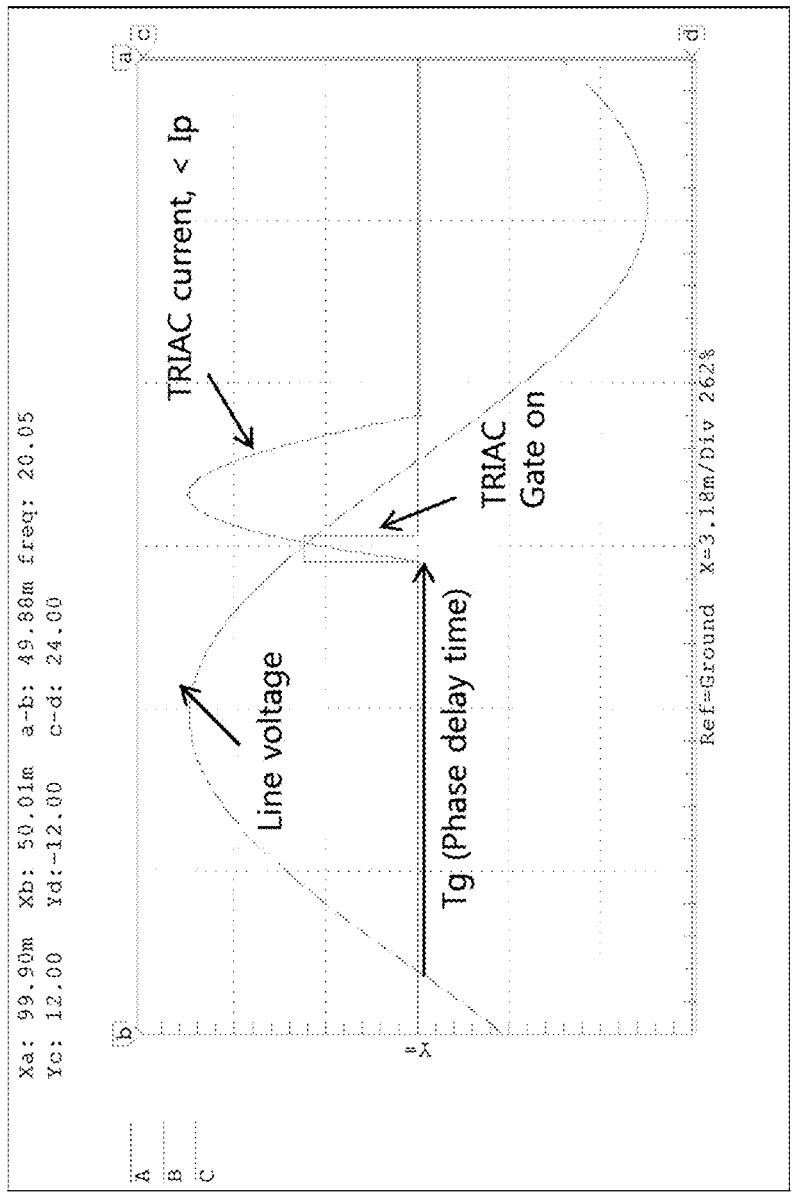
FIG. 12 is a graph illustrating an inrush current protection according to the present invention.

FIG. 5 is a flowchart illustrating a procedure of protecting a motor from an overcurrent in a Short circuit state according to the present invention, and FIG. 12 is a graph illustrating an overcurrent protection operation according to the present invention.

Referring to FIG. 5, when a power supply is turned on by an automatic or manual on/off switch to apply power to the terminals A1 and A2, the relay voltage VDD is generated by the relay power supply circuit 20 so that the power supply voltages VDD and GND are applied to the MCU 25 to operate the MCU 25, and this voltage (about 5-24V DC) is applied to the first relay coil RLY1 COIL so that the first relay contact RLY1 is turned on (S401).

In order to protect a circuit at the time of locking, the MCU 25 memorizes a zero-crossing time point of an input signal of the fourth input terminal IN4, and then sets the phase delay time Tg, and calculates the allowable peak current Ip to output the ON (pull down) signal to the first output terminal OUT1 so as to drive the TRIAC gate (S402-S405).

Thereafter, a current is received through the second input terminal IN2, and the load impedance Rw is calculated to determine whether a locking overcurrent is anticipated, and the TRIAC is turned off to protect the circuit from the overcurrent at the time of locking if it is determined that the short circuit current is anticipated, or, if it is determined that the locking overcurrent is not anticipated, the procedure proceeds to operation S104 so that a normal start procedure is performed (S406-S408).

As described above, according to the present invention, during an initial few cycles while starting a motor or while driving the motor, an overcurrent or a short circuit current that is equal to or lower than the allowable peak current of a semiconductor contact is applied to a circuit when a failure is detected through phase control of an applied voltage. In general, the semiconductor contact has excellent durability against an overcurrent during a half cycle, but burning damage still highly possibly occurs at a current equal to or higher than the allowable peak current. Therefore, to protect the semiconductor contact, as illustrated in FIG. 12, the zero-crossing time point of the input signal of the fourth input terminal IN4 is memorized, and then the phase delay time Tg is calculated to output the ON signal to the first output terminal OUT1 so as to turn on the TRIAC gate.

Referring to FIG. 12, the allowable peak current (non-repetitive peak current) Ip of the TRIAC may be calculated using Equation (1) below.

$$Ip=(V\max*\operatorname{Sin} T)/(Rw) \qquad (1)$$

where, T denotes a phase delay time, Vmax denotes a peak voltage level, and Rw denotes an inherent (wire) resistance.

Furthermore, $\operatorname{Sin} 120\pi Tg<(Ip\times Rw/V\max)$, if frequency=60 Hz, $(1/2)\pi<Tm<n$ or $(3/2)\pi<Tm<2\pi$, where absolute value of an input voltage level descends, and $Tm<Tg<n$ or $Tm<Tg<2\pi$, where Tg denotes a gate trigger phase delay time and Tm denotes a minimal gate trigger phase delay time.

C. Overload Protection

Figure 6:
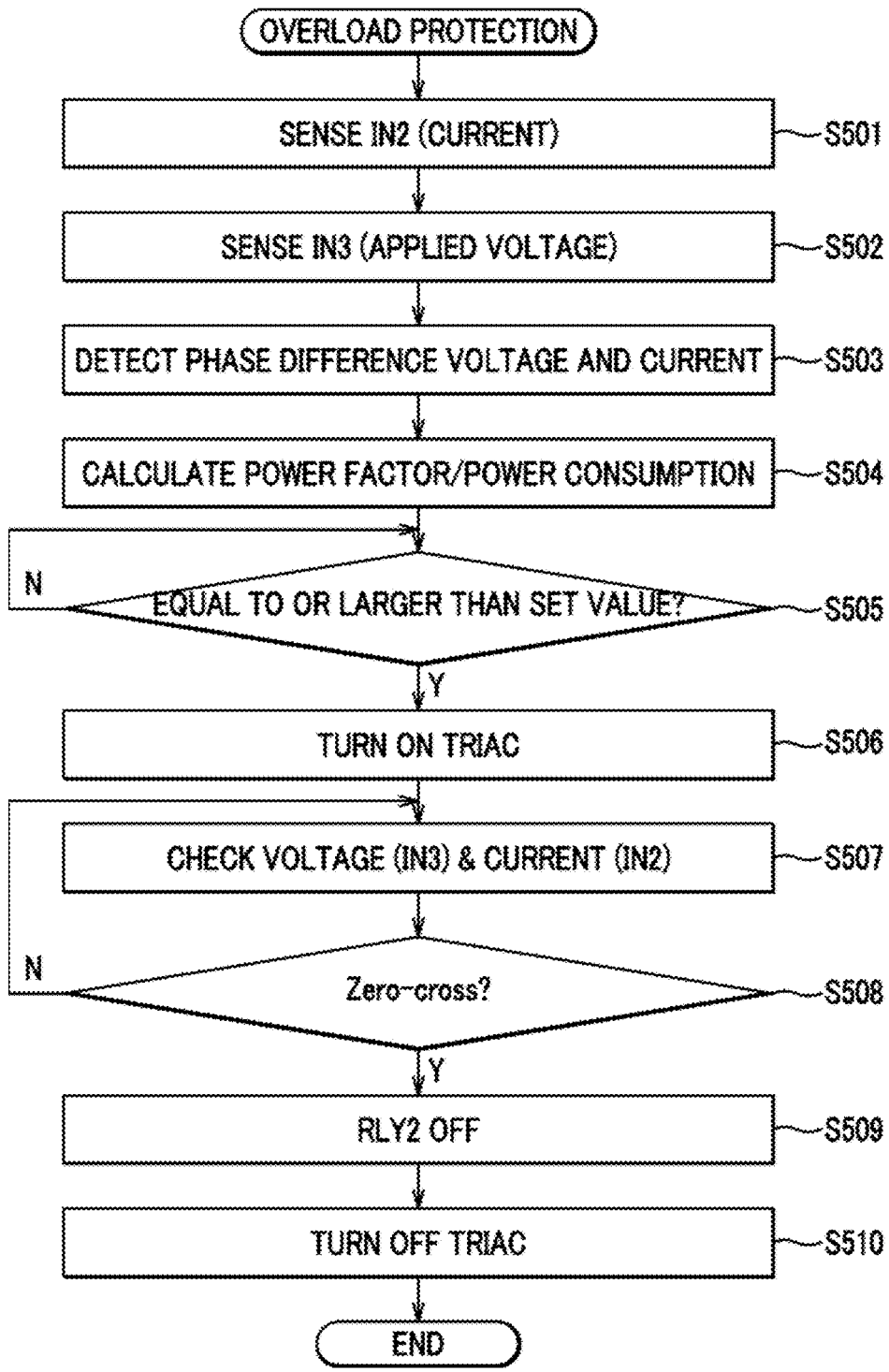
FIG. 6 is a flowchart illustrating a procedure of protecting a motor from an overload according to the present invention.
Figure 13:
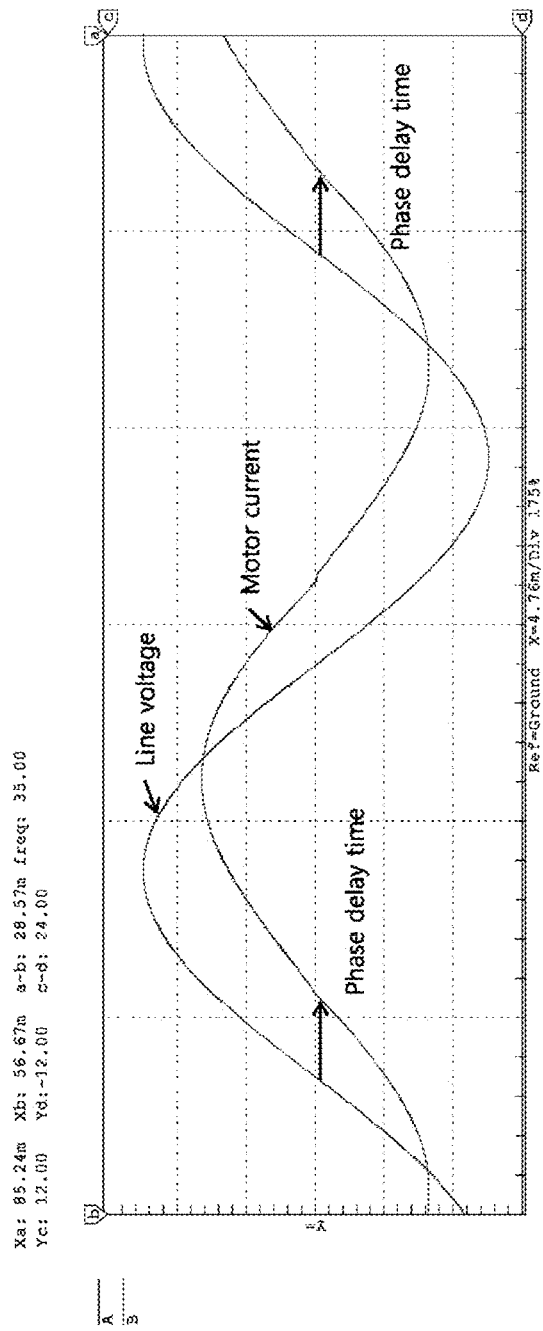
FIG. 13 is a graph illustrating an phase angle detection for power factor calculation according to the present invention.

FIG. 6 is a flowchart illustrating a procedure of protecting a motor from an overload according to the present invention, and FIG. 13 is a graph illustrating an overload protection operation according to the present invention.

A current-sensing-based overload protection technique that is typically used may be suitable for protecting a motor, but may be unstable for protecting a system according to a use environment and load variation since a current value is affected by voltage variation. Therefore, according to the present invention, not only an overcurrent but also power consumption of a load is detected to perform an overload protection method in consideration of load variation.

Referring to FIG. 6, while the motor is driven, the MCU 25 senses an applied current, an applied voltage and a phase difference through the second to fourth input terminals IN2 to IN4 respectively to calculate power consumption and a power factor according to Equation (2) below, compares the calculated values with preset overcurrent and power consumption protection setting values to turn on the TRIAC if the calculated values are equal to or larger than the setting values, checks a zero-cross point through the third and second input terminals IN3 and IN2, and then turns off the second relay RLY2 at the zero-cross point and turns off the TRIAC (S501-S510).

$$P=V\times I\times PF \qquad (2)$$

where, PF=Cos (Phase delay time*$2\pi$*Frequency).

Meanwhile, in the case of a TRIAC control mode, a load state may be checked by calculating a speed of the motor to perform protection.

D. Variable Load Energy Saving

Figure 7:
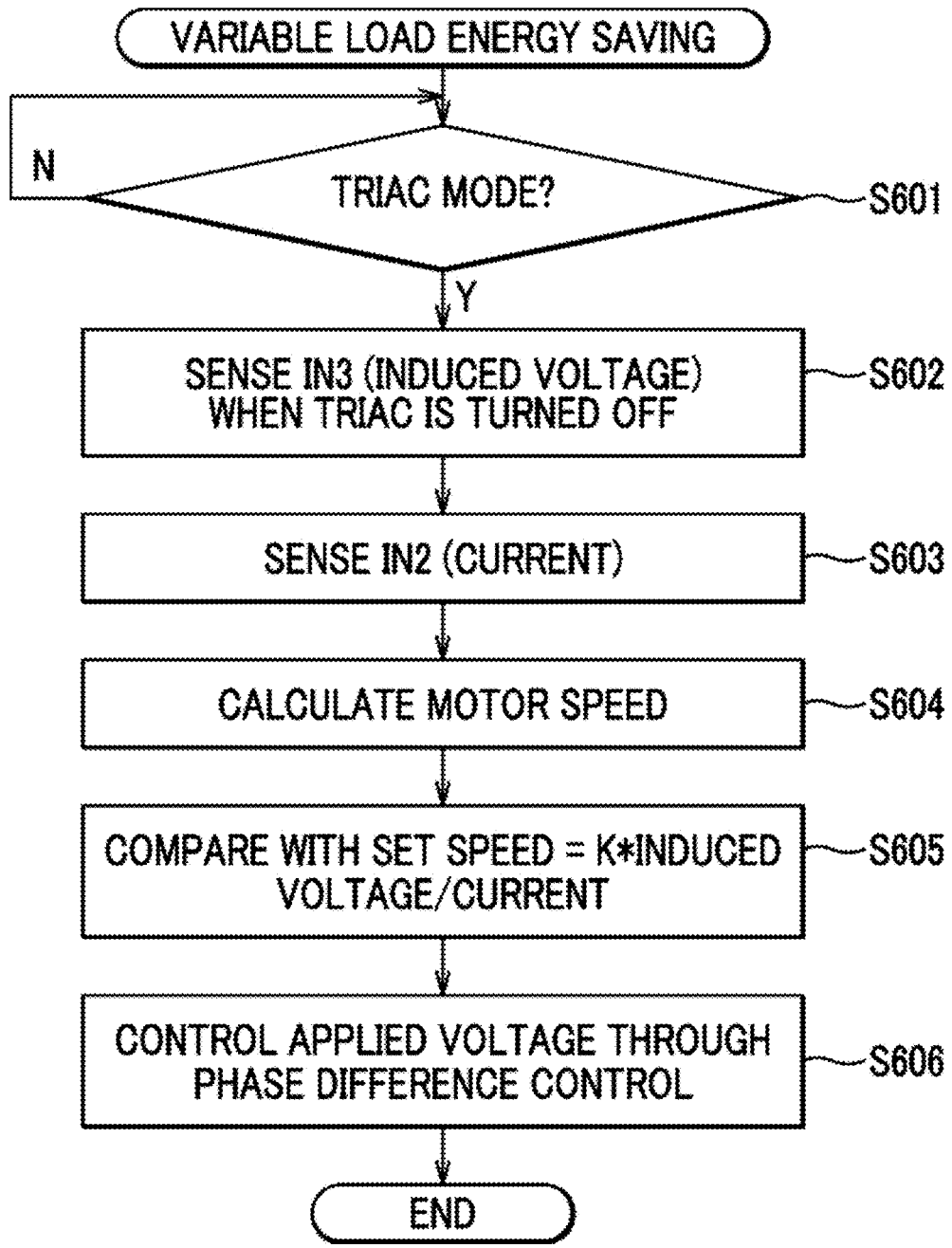
FIG. 7 is a flowchart illustrating a procedure of saving energy for a variable load according to the present invention.
Figure 14:
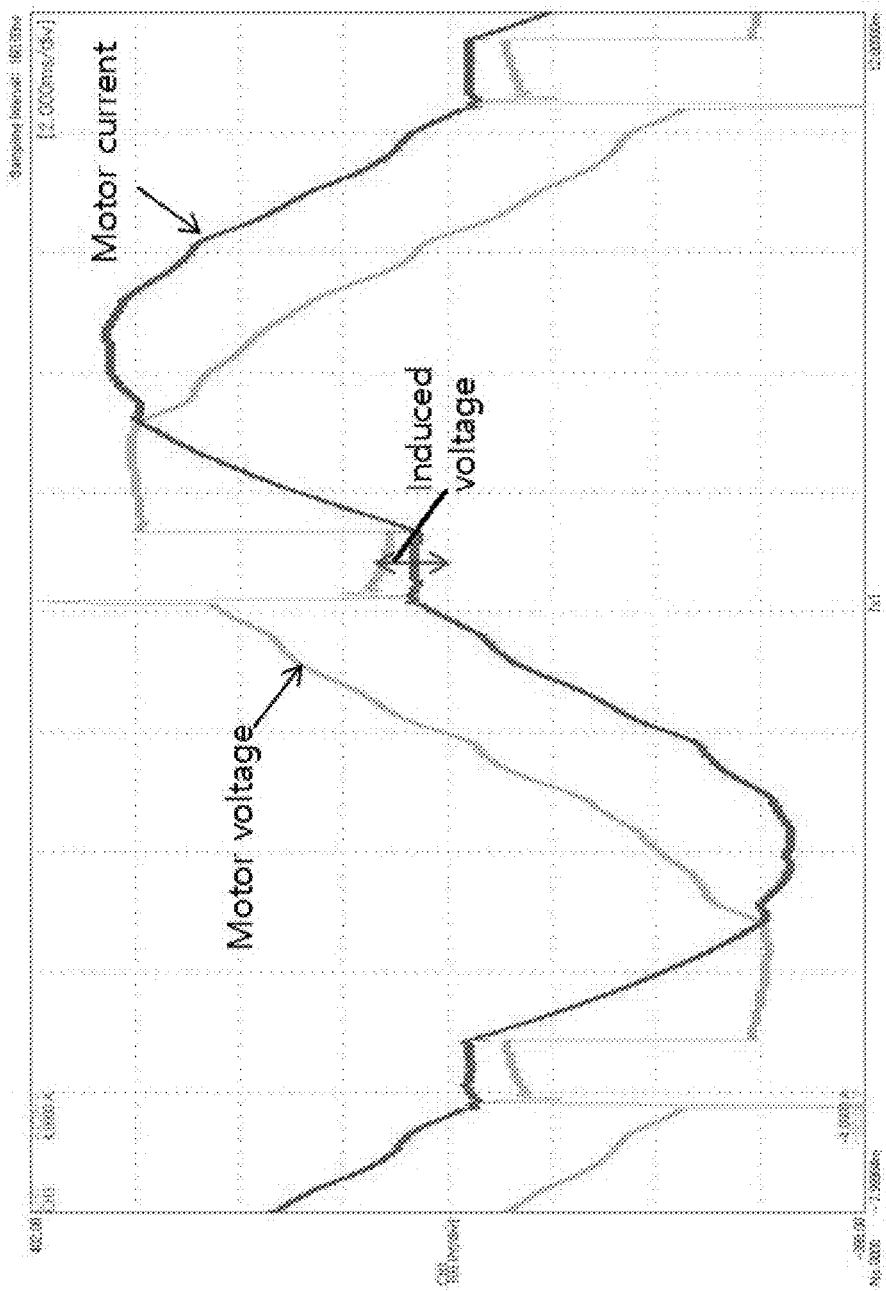
FIG. 14 is a graph illustrating a motor induced voltage detection for motor speed calculation according to the present invention.
Figure 15:
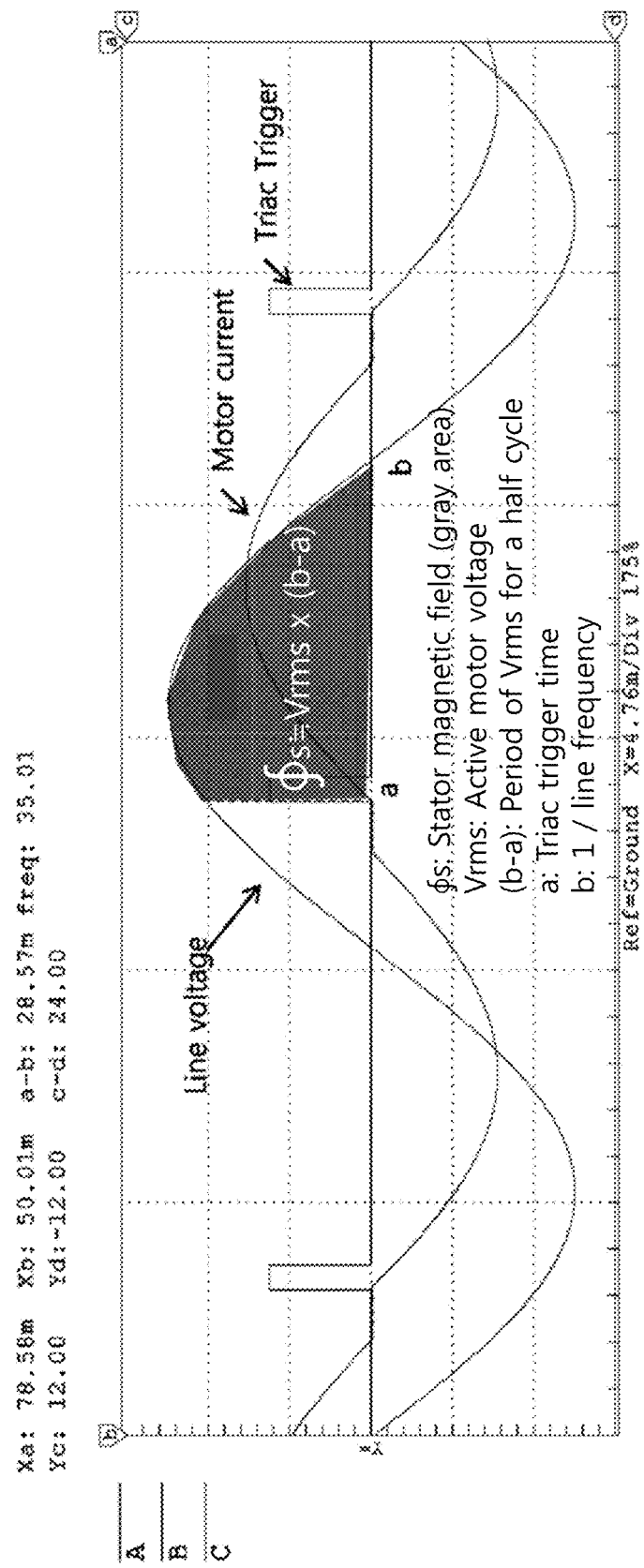
FIG. 15 is a graph illustrating an effective RMS voltage when a phase delay time is changed according to the present invention.
Figure 16:
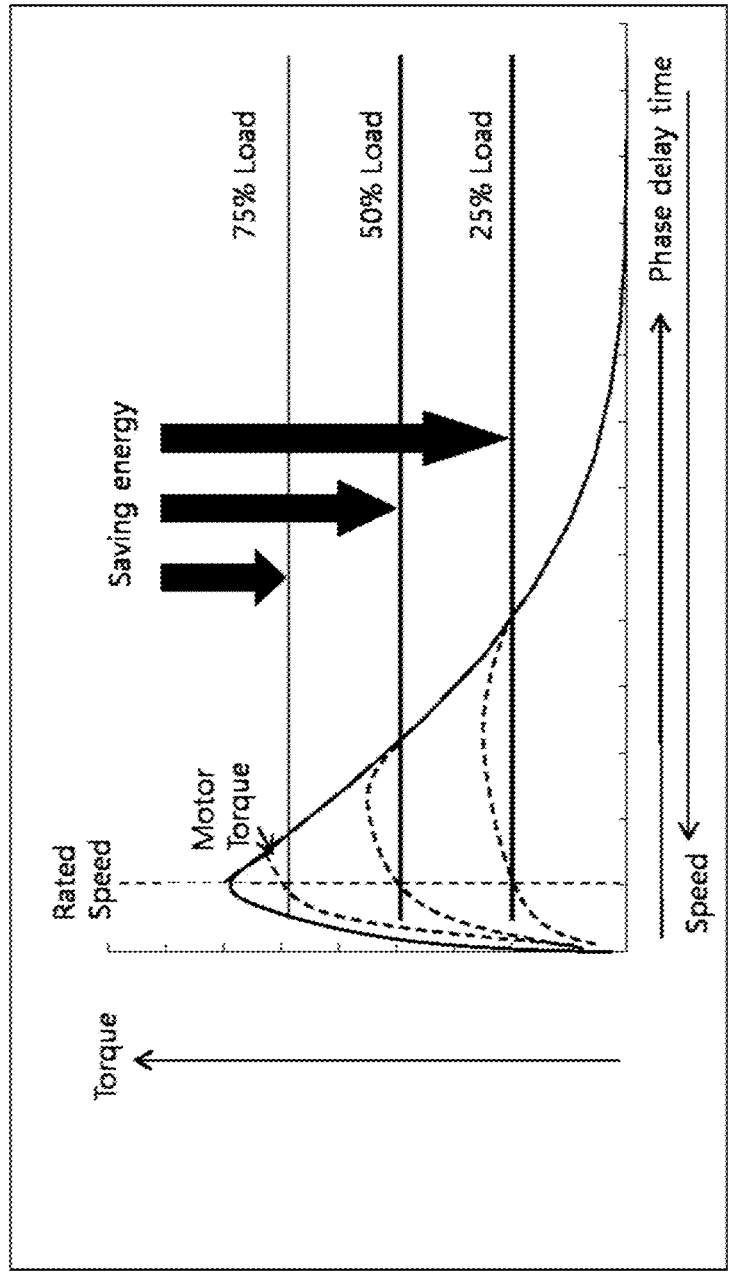
FIG. 16 is a graph illustrating the effect of energy saving when a load is changed according to the present invention.
Figure 17:
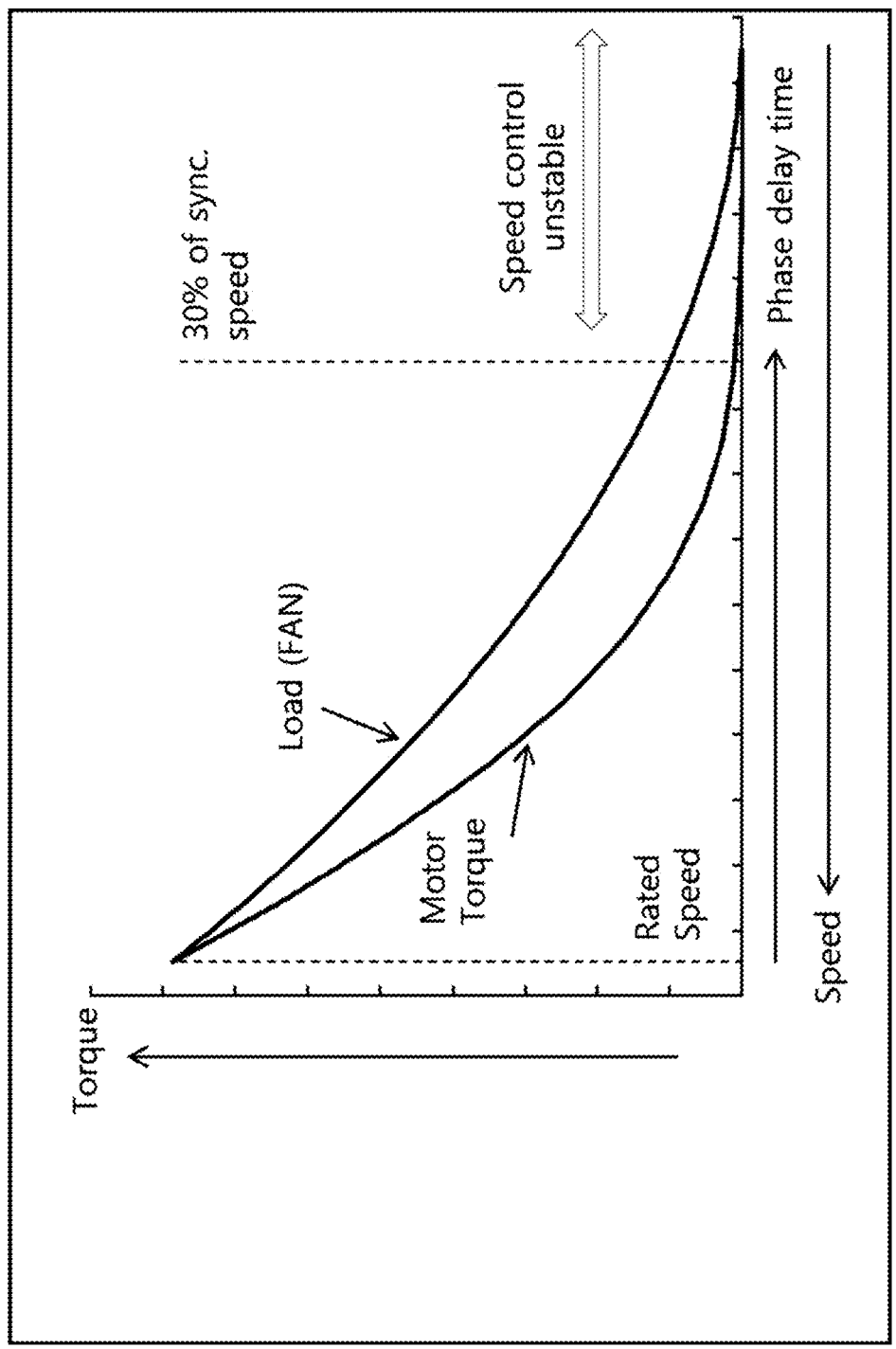
FIGS. 17 to 20 are graphs illustrating motor low speed control according to the present invention.
Figure 18:
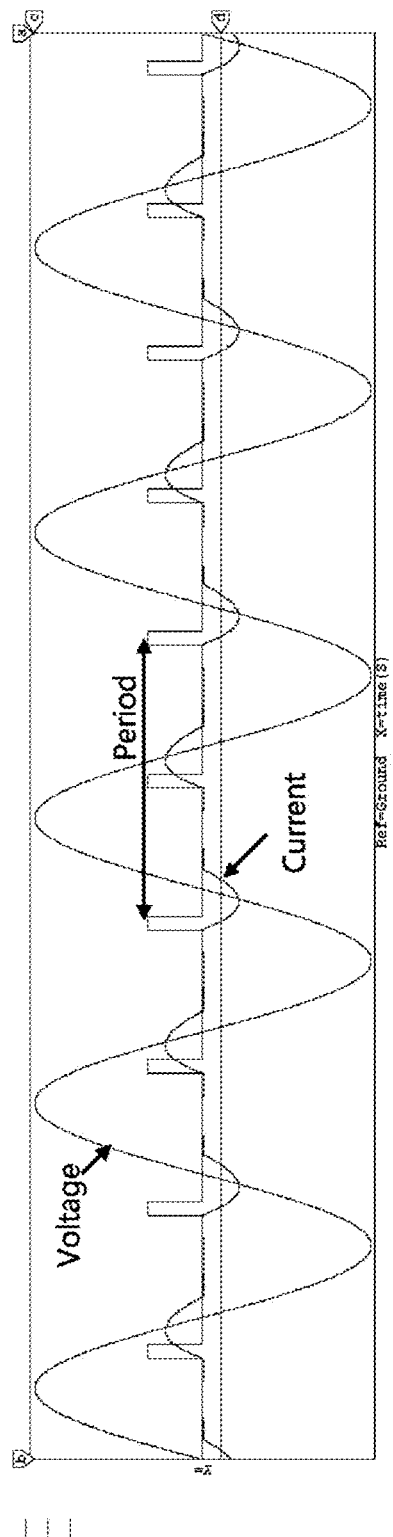
Figure 19:
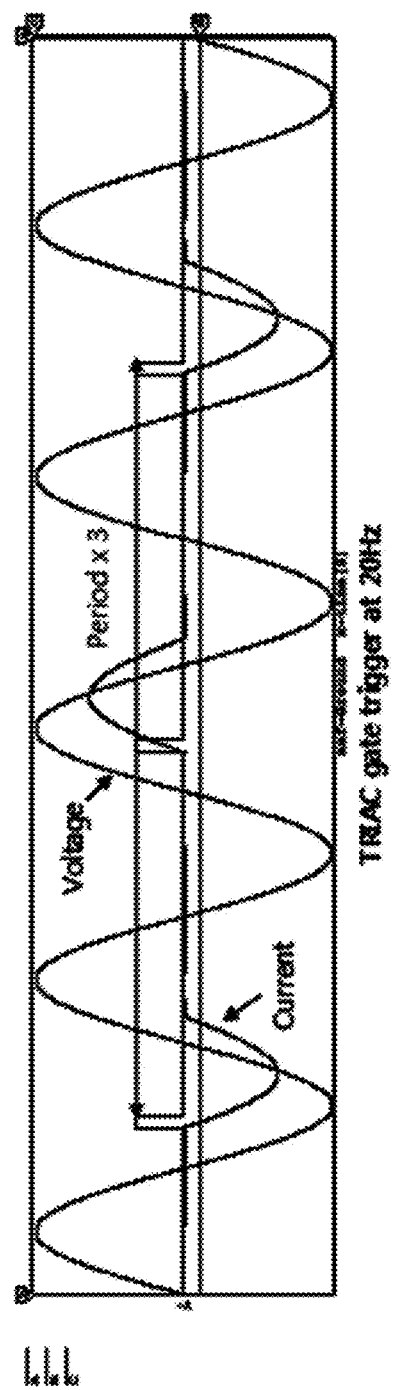
Figure 20:
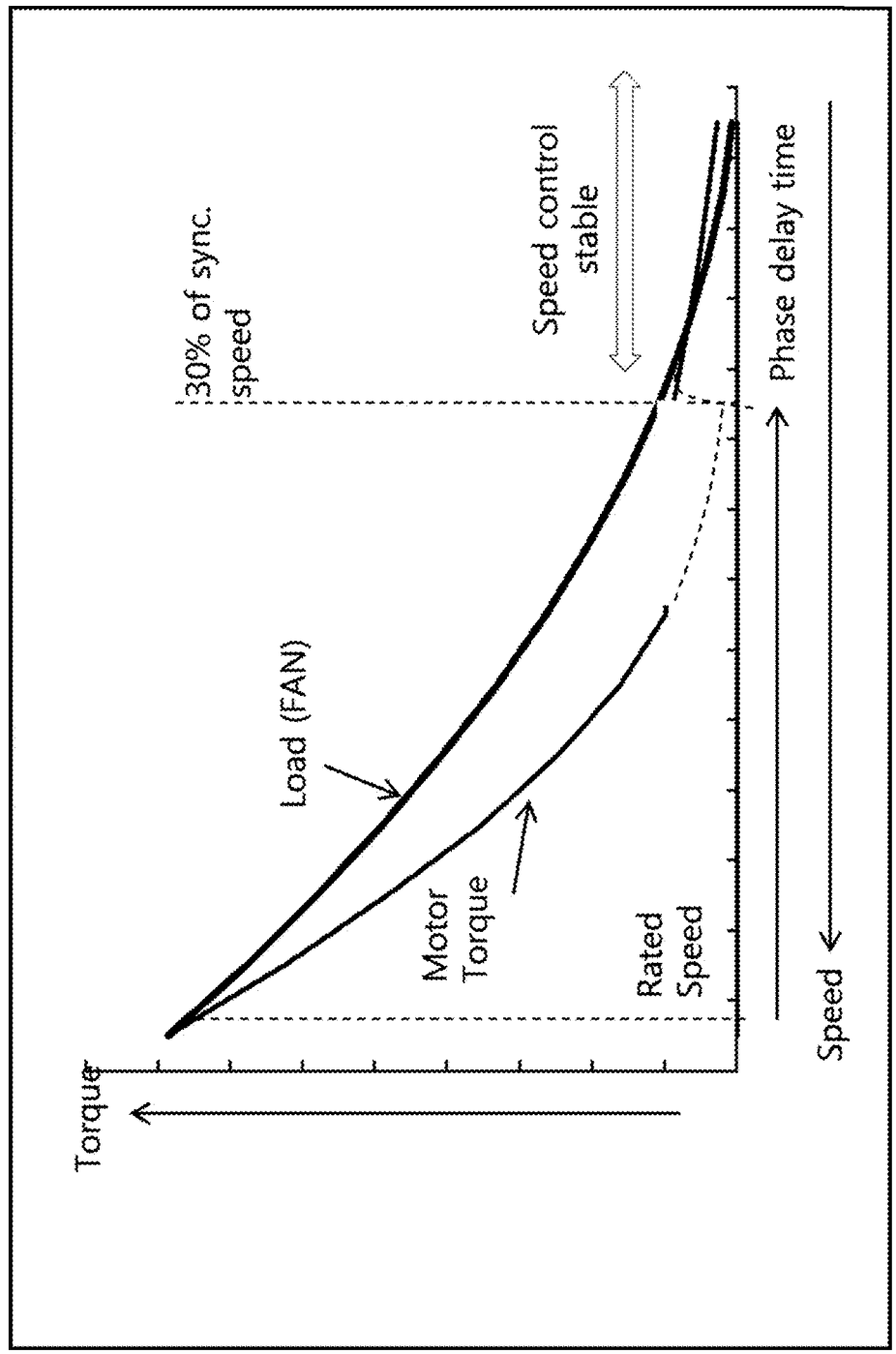

FIG. 7 is a flowchart illustrating a procedure of saving energy for a variable load according to the present invention, FIG. 14 is a graph illustrating energy saving when a load is changed according to the present invention, FIG. 15 is a graph illustrating an effective voltage when a load is changed according to the present invention, and FIG. 16 is a graph illustrating the effect of energy saving when a load is changed according to the present invention.

In the case where a load varies at a rated speed in, for example, a device for a belt, a level of an applied voltage may be changed by adjusting a cycle of turning on a gate of a TRIAC to constantly maintain a speed of a motor so as to improve the energy efficiency.

An external speed sensor is generally used. However, to decrease the cost due to the external speed sensor, according to a procedure of the present invention, as illustrated in FIG. 7, it is determined whether a current mode is the TRIAC mode to receive a motor coil induced voltage through the third input terminal IN3 via a differentiator (e.g., an OPAMP differentiator) of a sensing circuit (e.g., a speed/induced voltage sensing circuit) for a TRIAC off time if the motor is in the TRIAC mode, an applied current is received through the second input terminal IN2, the speed of the motor is calculated (i.e., sensorless control) to be compared to a set speed, and a level of an applied voltage is changed through the above-mentioned phase difference control scheme so that the applied voltage is constantly maintained (S601-S606).

Here, relations among the induced voltage, the motor current and the motor voltage are illustrated in FIG. 14, and the speed of the motor may be calculated using Equation (3) below.

Speed≈k·(Induced voltage/Motor current)

Induced voltage≈k·Speed·Stator magnetic field where k is a constant, and since

Stator magnetic field ($\phi$ s)≈Active motor voltage (Vrms)·Period (b−a)

as illustrated in FIG. 15, therefore, $$\text{Speed}\approx\text{Induced voltage}/(Vrms\cdot(b-a)) \qquad (\text{Eq 3})$$

A motor torque formula according to variation of the applied voltage through the phase difference control is described as below. The torque of the motor is maintained to be larger than a load torque until a rated driving or preset driving speed is reached, so that a motor driving speed is constant even when a load varies, and an amount of energy saving increases in inverse proportion to the load torque. Active motor voltage (Vrms) is the applied RMS voltage of the motor for a half cycle according to a phase difference as illustrated in FIG. 15 is calculated according to Equation (4) below.

$$Vrms=\sqrt{\int_a^b (V\max*\operatorname{Sin}120\pi T)^2/(b-a)} \qquad (4)$$

where a denotes a TRIAC trigger time, and b is 1/120 at a frequency of 60 Hz.

Furthermore, an intensity of a motor rotating magnetic field ($\phi$ m) is proportional to interaction ($\phi$ i) between a rotor magnetic field ($\phi$ r) and a stator magnetic field ($\phi$ s) that is proportional to the applied voltage as shown in Table 1 below.

TABLE 1

$f\,s \approx V_{rms} \cdot (b-a)$,
where (b-a) is the half cycle period of the active motor voltage (Vrms).
$f\,r \approx k \cdot f\,s$,
$f\,i \approx k \cdot (f\,s)^2$, since k is constant
$f\,m \approx (f\,s)^2 \cdot \Delta L$, where L = Motor length
Motor Torque $f\,(V_{rms} \cdot (b-a))^2$, since $\Delta L$ is constant and
Motor Torque $\approx f\,m$ According to the method of the present invention described above, energy may be saved as illustrated in FIG. 16.

E. Motor Speed Control

Figure 8:
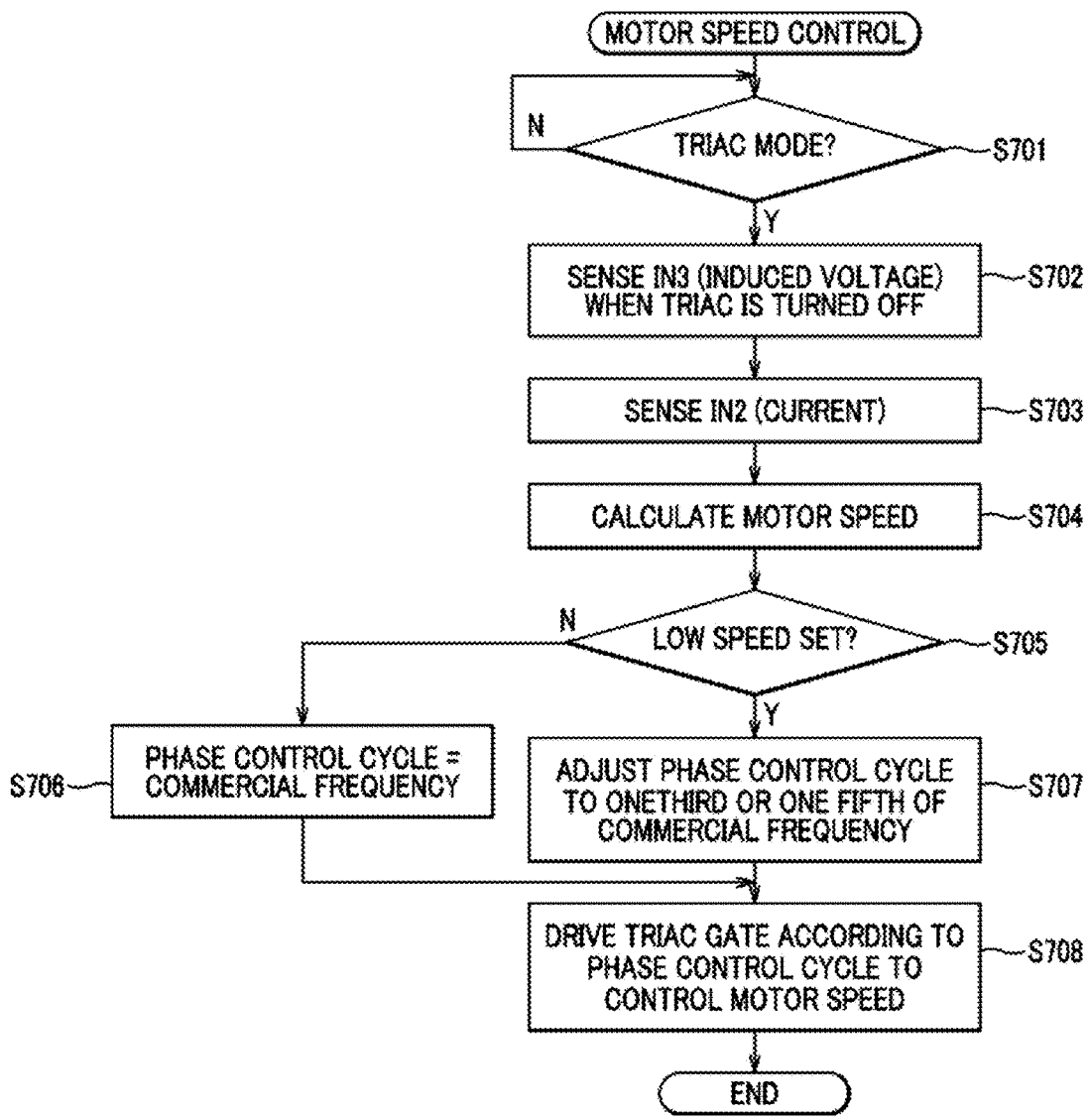
FIG. 8 is a flowchart illustrating a procedure of controlling a speed of a motor according to the present invention.

FIG. 8 is a flowchart illustrating a procedure of controlling a speed of a motor according to the present invention, and FIGS. 17 to 20 are graphs illustrating motor speed control according to the present invention.

In the case where a load torque varies with a speed as in a fan, a blower or a compressor, the load torque is proportional to the square of the rotation speed (i.e., load torque≈ (rotation speed)$^2$), the rotation speed is also changed by controlling the motor torque or the applied voltage of the motor as described in Table 1. According to a method of controlling the motor torque using the applied voltage alone, the energy saving rate is variable according to characteristics of a motor coil. In particular, the load torque decreases due to the speed decreases to less than 30% synchronous speed, whereas the increase rate of the motor coil friction due to the motor current increased, the control of the low speed reducing the motor applied voltage alone may not be efficient for the energy saving.

According to the present invention, the speed control at a low speed (e.g., 30% synchronous speed) is easy, while increasing the energy saving rate. As illustrated in FIG. 8, a motor coil induced voltage is received through the third input terminal IN3 via a differentiator (e.g., an OPAMP differentiator) of a sensing circuit (e.g., a speed/induced voltage sensing circuit) for a TRIAC off time in the case of the TRIAC mode, an applied current is received through the second input terminal IN2, the speed of the motor is calculated (i.e., sensorless control), and, if the speed is low, a control cycle for phase-controlling the applied voltage through the TRIAC is changed to one third (about 20 Hz) or one fifth (about 12 Hz) of a commercial frequency (about 60 Hz) according to the speed, wherein the phase difference between the voltage and the current is decreased to increase the applied voltage and the applied current in order to increase the motor torque (S701-S708).

As described above, a driving voltage is gradually applied to a start circuit through driving voltage phase control (e.g., AC phase control or AC chopper) using a semiconductor contact so as to regulate a start current, and, if the current decreases after the start is completed, the ON signal is output to the terminal OUT2 for controlling the contact of the relay RLY2 connected in parallel to the TRIAC so as to optimize the contact capacity of the second relay RLY2.

Furthermore, when the contact of the first relay RLY1 is switched over, the second relay RLY2 and the TRIAC are turned off, and, when the contact of the second relay RLY2 is switched over, the TRIAC is constantly turned on, wherein the signal of the second output terminal OUT2 is controlled such that the contact of the second relay RLY2 is switched over at a zero-cross point of a TRIAC current in consideration of a switching over time of the contact of the second relay RLY2, thereby avoiding an arc that may occur when the contact of the first relay RLY or the second relay RLY2 is switched over.

Moreover, when the overcurrent protection operation is performed, the peak value of an applied current of a motor is limited by phase-controlling an applied voltage of the motor in order to prevent damage to a contact, and, when the contact is switched over, an overcurrent or short circuit current that is equal to or lower than the allowable peak current of the semiconductor contact is applied to a circuit.

The arc-free phase control circuit for an AC motor according to the present invention regulates a start current through driving voltage phase control using a semiconductor contact to decrease a rated capacity of a relay so that the cost may be reduced. Furthermore, when the start is completed, a contact of a relay connected in parallel to the semiconductor contact is driven to thereby avoid an electric arc (e.g., spark or flash) that may occur when a contact is switched over.

Moreover, according to the present invention, a switch control circuit, an overcurrent sensing function and an overload protection function may be integrated in a digital circuit, so that the cost may be reduced. In addition, a phase control cycle of a control circuit may be extended so that speed control may be performed accurately even at a low speed, and energy efficiency may be improved even when a load varies.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An arc-free phase control circuit for an AC motor, comprising:
   a first relay for connecting a terminal of an AC power supply source to an AC motor;
   a TRIAC for connecting another terminal of the AC power supply source to the AC motor according to a first output terminal signal;
   a second relay connected in parallel to the TRIAC and for connecting another terminal of the AC power supply source to the AC motor according to a second output terminal signal;
   a voltage sensing unit configured to sense a TRIAC trigger power supply voltage rectified from an output of an isolation transformer with a primary input of a power supply source and output a TRIAC trigger power supply voltage signal to a first input terminal;
   a current sensing unit configured to sense a current applied by the AC power supply source and output an applied current signal to a second input terminal;
   a zero-cross point detection unit configured to detect a zero-cross point of an AC power supply source and output the zero-cross point to a third input terminal; and
   a controller configured to receive the TRIAC trigger power supply voltage, the applied current, the zero-cross point, and the induced voltage from the first to third input terminals, and to phase-control the TRIAC at every half cycle of a commercial frequency,
   wherein, when the AC motor is started or stopped according to a stability of the TRIAC trigger power supply voltage of the first input terminal, in order to protect a peripheral circuit from a short circuit accident only at a first time a TRIAC trigger current is allowed, the controller memorizes a zero-crossing time point of an AC power supply voltage and then outputs an ON signal to a first output terminal after a lapse of a certain phase delay time greater than 135° and less than 180° to drive a TRIAC gate so as to apply the current to the TRIAC in a voltage-dropped state, senses the current of the TRIAC which is in a half-wave state through the second input terminal to calculate a circuit impedance and an allowable peak current, and immediately turns off, if a short circuit current is anticipated at a rated AC power supply voltage, so as to protect the peripheral circuit from the short circuit accident within a half cycle, and wherein, while in a TRIAC mode, the controller receives a coil induced voltage through the third input terminal for a TRIAC-off time and calculates a speed of the AC motor and if the calculated speed is low, then adjusts phase-control a cycle to one third or one fifth of the commercial frequency according to the calculated speed of the AC motor.

2. The arc-free phase control circuit of claim 1, wherein the arc-free phase control circuit is applied to a three-phase AC motor using:

a first relay combination comprising the first relay connected in series to a first-phase line, a first TRIAC connected in series to a second-phase line, and the second relay connected in parallel to the first TRIAC; and a second relay combination comprising a third relay connected in series to the second-phase line, a second TRIAC connected in series to a third-phase line, and a fourth relay connected in parallel to the second TRIAC.

* * * * *